(12) United States Patent
Morioka

(10) Patent No.: US 11,314,180 B2
(45) Date of Patent: Apr. 26, 2022

(54) CHARGING ROLLER

(71) Applicant: BRIDGESTONE CORPORATION, Tokyo (JP)

(72) Inventor: Manami Morioka, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 91 days.

(21) Appl. No.: 17/035,683

(22) Filed: Sep. 29, 2020

(65) Prior Publication Data

US 2021/0103228 A1    Apr. 8, 2021

(30) Foreign Application Priority Data

Oct. 2, 2019    (JP) .............................. JP2019-182446

(51) Int. Cl.
| | |
|---|---|
| *G03G 15/02* | (2006.01) |
| *C08J 9/00* | (2006.01) |
| *C08G 18/10* | (2006.01) |
| *C08G 18/76* | (2006.01) |
| *C08G 18/48* | (2006.01) |
| *C08G 18/61* | (2006.01) |
| *C08G 18/24* | (2006.01) |
| *C08J 9/36* | (2006.01) |

(52) U.S. Cl.
CPC ......... *G03G 15/0233* (2013.01); *C08G 18/10* (2013.01); *C08G 18/246* (2013.01); *C08G 18/4812* (2013.01); *C08G 18/4829* (2013.01); *C08G 18/61* (2013.01); *C08G 18/7621* (2013.01); *C08J 9/0066* (2013.01); *C08J 9/365* (2013.01); *C08G 2110/005* (2021.01); *C08J 2375/08* (2013.01)

(58) Field of Classification Search
CPC ...................... G03G 15/0216; G03G 15/0233
USPC ......................................................... 399/176
See application file for complete search history.

(56) References Cited

U.S. PATENT DOCUMENTS

| | | | |
|---|---|---|---|
| 10,268,132 B2* | 4/2019 | Fujino et al. ...... | G03G 15/0233 |
| 2017/0184992 A1* | 6/2017 | Morimoto .......... | G03G 15/0233 |

FOREIGN PATENT DOCUMENTS

| | | |
|---|---|---|
| JP | 2015114392 A | 6/2015 |
| JP | 2019105765 A | 6/2019 |

* cited by examiner

*Primary Examiner* — William J Royer
(74) *Attorney, Agent, or Firm* — Kenja IP Law PC

(57) ABSTRACT

Provided are a charging roller excellent in charging characteristics (charging property/charge imparting property), elasticity/flexibility, durability, and filming resistance, and an image forming apparatus using the charging roller. The charging roller includes a shaft, and at least a base layer and a surface layer on an outer peripheral portion of the shaft in a radial direction, where the surface layer contains large-particle size particles and small-particle size particles having different average particle sizes and further contains hydrophilic particles; the water contact angle of the hydrophilic particles measured with a sessile drop technique is preferably more than 0 degree and 90 degrees or less and more preferably 50 degrees or more and 90 degrees or less; the large-particle size particles are large-particle size acrylic resin particles; the small-particle size particles are small-particle size acrylic resin particles; and the hydrophilic particles are hydrophilic silica particles.

20 Claims, 2 Drawing Sheets

CHARGING ROLLER

TECHNICAL FIELD

This disclosure relates to a charging roller.

BACKGROUND

In an image forming apparatus typified by a copying machine, a laser beam printer or the like, image forming and printing is performed by the following series of processes, and the series of processes are repeated in a cycle:

1) the surface of a photoconductor is uniformly charged (charging);

2) an image of a subject is read by an optical system, image information is projected as light on the photoconductor (exposure), and a latent image is formed by erasing electric charges of a light-exposed portion of the photoconductor (electrostatic latent image formation);

3) toner is adhered to the photoconductor on which an electrostatic latent image has been formed, and a toner image is formed from the electrostatic latent image (development);

4) the toner image is overlaid on a recording medium such as paper and fixed (transcription and fixation);

5) toner remaining on the photoconductor is removed (photoconductor cleaning); and 6) all electric charges on the surface of the photoconductor are removed (static elimination).

In the series of image forming and printing processes, a contact charging method has been increasingly adopted as the "charging" method because of the ease of safety maintenance of equipment and the environmental advantage of less harmful substances. In the contact charging method, a charging member, to which a voltage has been applied, is brought into contact with a photoconductor, which is a member to be charged, at a predetermined pressure so that a surface of the photoconductor is uniformly charged.

With respect to the charging member, a charging roller having a multilayer structure, in which a conductive elastic layer (base layer) made of rubber, urethane resin or the like is formed on an outer peripheral portion of a shaft in the radial direction, and a surface layer is further provided to improve the surface properties, has been used, for example.

Examples of characteristics indicating the superiority or inferiority of the performance of the charging roller for uniformly charging a surface of a photoconductor (that is, the performance relating to the quality of image forming and printing) include charging characteristics (charging property/charge imparting property), elasticity/flexibility, and durability. Inventions relating to the composition of the surface layer of the charging roller have been disclosed so that these characteristics could be improved (JP 2019-105765 A (PTL 1)).

On the other hand, since the charging roller comes into direct contact with the photoconductor in the process of "charging", the toner left on the photoconductor due to incomplete "photoconductor cleaning" may adhere to the surface of the charging roller. Therefore, it is also necessary to clean the charging roller to remove the toner adhered to the surface of the charging roller. However, an external additive, wax, or the like contained in the components of the toner often stick on the surface of the charging roller, which renders it difficult to clean the charging roller (filming phenomenon). As a result, the charging characteristics (charging property/charge imparting property), elasticity/flexibility, durability and other characteristics of the charging roller are impaired, and the contact between the charging roller and the photoconductor causes, for example, contamination and damage on the photoconductor, which further deteriorates the quality of image forming and printing, decreases the durability of the image forming apparatus, and causes other problems. Therefore, there is an increasing technical need for suppressing the occurrence of filming phenomenon in a charging roller (filming resistance) to solve the problem.

With respect to the filming resistance, a developing roller, which is a developing roller used during the "development" in the aforementioned series of image forming and printing processes, has been disclosed, where the filming resistance of the developing roller is improved by dispersing silica particles in an acrylic resin of the surface layer of the developing roller (JP 2015-114392 A (PTL 2)). However, PTL 2 also discloses that, as a comparative example, when silica particles are dispersed in a urethane resin, the filming resistance of the developing roller is deteriorated rather than improved.

CITATION LIST

Patent Literature

PTL 1: JP 2019-105765 A
PTL 2: JP 2015-114392 A

SUMMARY

It could thus be helpful to provide a charging roller that has excellent charging characteristics (charging property/charge imparting property), elasticity/flexibility, and durability, as well as excellent filming resistance. It could also be helpful to provide an image forming apparatus using the charging roller.

We have made various studies on a charging roller having a shaft, and at least a base layer and a surface layer on an outer peripheral portion of the shaft in the radial direction with respect to the composition of the surface layer to solve the aforementioned problem As a result, we discovered that a charging roller having excellent charging characteristics (charging property/charge imparting property), elasticity/flexibility, durability, and filming resistance can be obtained when the composition of a surface layer of the charging roller contains large-particle size particles and small-particle size particles having different average particle sizes and further contains hydrophilic particles. In addition, we discovered that there is a correlation between a low water contact angle of hydrophilic particles (that is, high hydrophilicity) and excellent filming resistance of a charging roller, and completed the present disclosure.

That is, the charging roller of the present disclosure is 1. a charging roller comprising a shaft, and at least a base layer and a surface layer on an outer peripheral portion of the shaft in a radial direction, wherein the surface layer contains large-particle size particles and small-particle size particles having different average particle sizes and further contains hydrophilic particles.

Such a charging roller is excellent in charging characteristics (charging property/charge imparting property), elasticity/flexibility, durability, and filming resistance.

Further, the charging roller of the present disclosure is preferably 2. the charging roller according to 1., wherein a water contact angle of the hydrophilic particles measured with a sessile drop technique is more than 0 degree and 90 degrees or less.

Such a charging roller is superior in filming resistance.

Further, the charging roller of the present disclosure is preferably 3. the charging roller according to 1., wherein a water contact angle of the hydrophilic particles measured with a sessile drop technique is 50 degrees or more and 90 degrees or less.

Such a charging roller is superior in filming resistance. In addition, commercially available hydrophilic particles can be used during the manufacture of the charging roller, which renders it possible to manufacture a charging roller superior in filming resistance at lower costs and more easily.

Further, the charging roller of the present disclosure is preferably 4. the charging roller according to any one of 1. to 3., wherein the large-particle size particles are large-particle size acrylic resin particles.

Such a charging roller is superior in charging characteristics (charging property/charge imparting property) and durability. In addition, commercially available large-particle size acrylic resin particles can be used during the manufacture of the charging roller, which renders it possible to manufacture a charging roller superior in charging characteristics (charging property/charge imparting property) and durability at lower costs and more easily.

Further, the charging roller of the present disclosure is preferably 5. the charging roller according to any one of 1. to 4., wherein the small-particle size particles are small-particle size acrylic resin particles.

In such a charging roller, the charging characteristic (charging property/charge imparting property) are more uniform in the surface layer of the charging roller. In addition, commercially available small-particle size acrylic resin particles can be used during the manufacture of the charging roller, which renders it possible to manufacture a charging roller superior in charging characteristics (charging property/charge imparting property) and durability at lower costs and more easily.

Further, the charging roller of the present disclosure is preferably 6. the charging roller according to any one of 1. to 5., wherein the hydrophilic particles are hydrophilic silica particles.

Such a charging roller is superior in filming resistance. In addition, commercially available hydrophilic silica particles can be used during the manufacture of the charging roller, which renders it possible to manufacture a charging roller superior in filming resistance at lower costs and more easily.

Further, the charging roller of the present disclosure is preferably 7. the charging roller according to any one of 1. to 6., wherein the large-particle size particles are large-particle size particles having an average particle size of 10 μm or more and 20 μm or less, and the small-particle size particles are small-particle size particles having an average particle size of 2 μm or more and less than 10 μm.

Such a charging roller is superior in charging characteristics (charging property/charge imparting property), and the characteristics are more uniform in the surface layer of the charging roller.

Further, the charging roller of the present disclosure is preferably 8. the charging roller according to any one of 1. to 7., wherein the hydrophilic particles are hydrophilic particles having an average particle size of 2 nm or more and 10 μm or less.

Such a charging roller is superior in filming resistance, and the filming resistance is more uniform in the surface layer of the charging roller.

Further, the charging roller of the present disclosure is preferably 9. the charging roller according to any one of 1. to 8., wherein the surface layer contains a urethane resin, and the surface layer contains 5 parts by mass or more and 30 parts by mass or less of the large-particle size particles with respect to 100 parts by mass of the urethane resin.

Such a charging roller is superior in charging characteristics (charging property/charge imparting property), and the characteristics are more uniform in the surface layer of the charging roller.

Further, the charging roller of the present disclosure is preferably 10. the charging roller according to any one of 1. to 9., wherein the surface layer contains a urethane resin, and the surface layer contains 15 parts by mass or more and 75 parts by mass or less of the small-particle size particles with respect to 100 parts by mass of the urethane resin.

In such a charging roller, the charging characteristics (charging property/charge imparting property) are more uniform in the surface layer of the charging roller. In addition, the viscosity of the surface layer composition is not too high, so that the handling is easier.

Further, the charging roller of the present disclosure is preferably 11. the charging roller according to any one of 1. to 10., wherein the surface layer contains a urethane resin, and the surface layer contains 2 parts by mass or more and 15 parts by mass or less of the hydrophilic particles with respect to 100 parts by mass of the urethane resin.

Such a charging roller is superior in filming resistance. In addition, the viscosity of the surface layer composition is not too high, so that the handling is easier.

Furthermore, the image forming apparatus of the present disclosure is 12. an image forming apparatus using the charging roller according to any one of 1. to 11.

Such an image forming apparatus has good image forming and printing quality, and the good state continues for a longer period of time.

The present disclosure provides a charging roller that has excellent charging characteristics (charging property/charge imparting property), elasticity/flexibility, and durability, as well as excellent filming resistance. In addition, the present disclosure provides an image forming apparatus using the charging roller.

Each reference signs found in the figures indicate the following:

1 charging roller;
2 shaft;
3 base layer;

4 surface layer;
22 charging roller cleaning roller;
23 photoconductor;
24 toner;
25 toner supply roller;
26 developing roller;
27 layer-forming blade;
28 transcribing roller;
29 photoconductor cleaning roller;
41 surface layer-forming resin;
42 large-particle size particle;
43 small-particle size particle;
44 hydrophilic particle;

DETAILED DESCRIPTION

The following describes an embodiment of the present disclosure in detail. The descriptions are for illustrative purposes only and are not to be construed to limit the scope of the present disclosure.

The following describes each component of a charging roller 1 of the present disclosure.

(Shaft)

Figure 1:
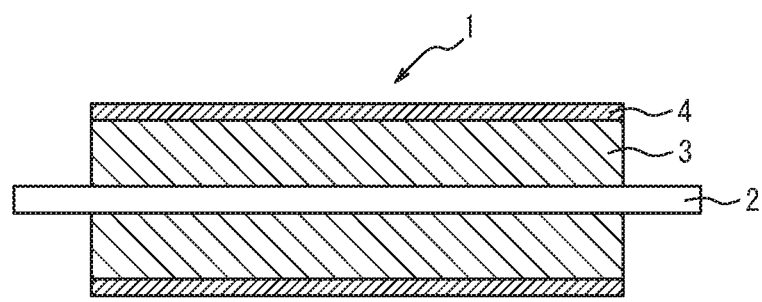
FIG. 1 is a cross-sectional view schematically illustrating an embodiment of the charging roller of the present disclosure.

The charging roller 1 of the present disclosure includes a shaft 2, as illustrated as one embodiment in FIG. 1. The material forming the shaft 2 is not particularly limited as long as it has good conductivity, and examples thereof include a shaft made of metal, a shaft made of a resin base material with high rigidity, and a combination thereof. It may be a cylindrical body having a hollow interior made of metal or a high-rigidity resin.

In the case of using a resin with high rigidity for the shaft, it is preferable to add a conductive agent to the high-rigidity resin and disperse the conductive agent in the high-rigidity resin to ensure sufficient conductivity. The conductive agent dispersed in the high-rigidity resin is preferably a powdered conductive agent such as carbon black powder, graphite powder, carbon fiber, powder of metal such as aluminum, copper and nickel, powder of a metallic oxide such as tin oxide, titanium oxide and zinc oxide, and conductive glass powder. These conductive agents may be used alone or in combination of two or more. The blending amount of the conductive agent is not particularly limited, yet it is preferably in the range of 5% by mass or more and 40% by mass or less, and more preferably in the range of 5% by mass or more and 20% by mass or less with respect to the total of the high-rigidity resin.

Examples of the material of the metal shaft or the metal cylindrical body include iron, stainless steel, and aluminum, which may be plated with zinc or nickel. In addition, examples of the material of the resin base material with high rigidity include polyacetal, polyamide 6, polyamide 6,6, polyamide 12, polyamide 4,6, polyamide 6,10, polyamide 6,12, polyamide 11, polyamide MXD6, polybutylene terephthalate, polyphenylene oxide, polyphenylene sulfide, polyether sulfone, polycarbonate, polyimide, polyamide-imide, polyether-imide, polysulfone, polyether ether ketone, polyethylene terephthalate, polyarylate, liquid crystal polymer, polytetrafluoroethylene, polypropylene, ABS resin, polystyrene, polyethylene, melamine resin, phenol resin, and silicone resin. Among these, polyacetal, polyamide 6,6, polyamide MXD6, polyamide 6,12, polybutylene terephthalate, polyphenylene ether, polyphenylene sulfide, and polycarbonate are preferable. These high-rigidity resins may be used alone or in combination of two or more.

(Base Layer)

A base layer 3 of the charging roller 1 of the present disclosure is a layer located on the outer peripheral portion of the shaft 2 of the charging roller 1 in the radial direction, as illustrated as one embodiment in FIG. 1. The base layer may typically be a layer closest to the shaft among the layers formed on the outer peripheral portion of the shaft in the radial direction, and may typically be formed on the outer peripheral portion of the shaft in the radial direction so as to be directly adjacent to the shaft. In addition, the base layer of the charging roller of the present disclosure may typically be the thickest layer among the layers formed on the outer peripheral portion of the shaft in the radial direction. The base layer mainly contributes to the shape and elasticity of the charging roller.

The material forming the base layer is not particularly limited and can be appropriately selected depending on the purpose. Examples thereof include, urethane resin, rubber elastic body, polyamide resin, polyester resin, polyimide resin, silicone resin, acrylic resin, polyvinylidene fluoride resin, polyvinyl butyral resin, ethylene-tetrafluoroethylene copolymer resin, melamine resin, fluororesin, epoxy resin, polycarbonate resin, polyvinylalcohol resin, cellulose resin, polyvinylidene chloride resin, polyvinyl chloride resin, polyethylene resin, and ethylene-vinyl acetate copolymer resin. These may be used alone or in combination of two or more. Among these, urethane resin is preferable because it can achieve good flexibility.

The urethane resin can be obtained by subjecting polyol and isocyanate to a polyaddition reaction with a known reaction method. The urethane resin is not particularly limited and can be appropriately selected depending on the purpose. Examples thereof include urethane foam obtained by foaming with a foam stabilizer, and non-foam urethane obtained without foaming. These may be used alone or in combination of two or more. Among these, urethane foam is advantageous in that it has excellent flexibility.

The rubber elastic body is not particularly limited and can be appropriately selected depending on the purpose. Examples thereof include natural rubber, isoprene rubber, chloroprene rubber, epichlorohydrin rubber, butyl rubber, fluororubber, styrene-butadiene rubber, butadiene rubber, nitrile rubber, ethylene-propylene rubber, epichlorohydrin-ethylene oxide copolymer rubber, epichlorohydrin-ethylene oxide-allyl glycidyl ether copolymer rubber, ethylene-propylene-diene terpolymer rubber (EPDM), acrylonitrile-butadiene copolymer rubber (NBR), and a blend of these rubbers. These may be used alone or in combination of two or more.

The base layer can be formed of a base layer composition. The base layer composition can be appropriately selected depending on the purpose without any limitation, provided that it is a composition that can form the base layer. In the case of forming an elastic layer of the urethane resin, the composition for the elastic layer preferably contains components such as polyol, isocyanate, a urethane bond catalyst, and a filler. Further, in the case of forming an elastic layer of the urethane foam, it is preferable to further contain a foam stabilizer. The base layer composition may contain, in addition to the above components, a conductive agent, a plasticizer, a softener, a tackifier, an anti-tack agent, a separating agent, a release agent, an extending agent, a coloring agent, a crosslinking agent, a vulcanizing agent, a polymerization inhibitor, and the like as required.

The polyol is not particularly limited and can be appropriately selected depending on the purpose. Examples thereof include polyether polyol, polyester polyol, polytetramethylene glycol, polybutadiene polyol, alkylene oxide modified polybutadiene polyol, and polyisoprene polyol. These may be used alone or in combination of two or more. Among these, polyether polyol is preferable from the viewpoint of the flexibility of the resin, the permanent compression strain, and from the viewpoint of reducing the resistance fluctuation due to long-term energization.

The isocyanate is not particularly limited and can be appropriately selected depending on the purpose. Examples thereof include tolylene diisocyanate (TDI), prepolymerized tolylene diisocyanate (prepolymerized TDI), diphenylmethane diisocyanate (MDI), crude diphenylmethane diisocyanate (crude MDI), isophorone diisocyanate (IPDI), hydrogenated diphenylmethane diisocyanate, hydrogenated tolylene diisocyanate, hexamethylene diisocyanate (HDI); and isocyanurate modified products, carbodiimide modified products, glycol modified products of these isocyanates. These may be used alone or in combination of two or more. Among these, prepolymerized tolylene diisocyanate (prepolymerized TDI) is preferable because it is highly reactive in the urethane foam reaction and easily improves the elasticity of the base layer and thus the elasticity of the charging roller.

The urethane bond catalyst is not particularly limited and can be appropriately selected depending on the purpose. Examples thereof include dibutyltin dilaurate, dioctyltin acetate, dioctyltin bis(ethylmalate), dibutyltin bis(oleyl-malate), dibutyltin diacetate, dibutyltin thiocarboxylate, dibutyltin dimaleate, dioctyltin thiocarboxylate, tin octenoate, and monobutyltin oxide. These may be used alone or in combination of two or more. Among these, dibutyltin dilaurate is preferable because it has high catalytic activity.

The foam stabilizer is not particularly limited and can be appropriately selected depending on the purpose. Examples thereof include a silicone-based foam stabilizer, an ionic surfactant, and a nonionic surfactant.

These may be used alone or in combination of two or more. Among these, a silicone-based foam stabilizer is preferable because it provides good foam uniformity in the foam. Further, the silicone-based foam stabilizer preferably has a functional group. The functional group of the silicone-based foam stabilizer is not particularly limited and can be appropriately selected depending on the purpose. Examples thereof include an OH (hydroxyl) group, a thiol group, an amino group, an imino group, a nitro group, a nitroso group, a carboxyl group, an acroyl group, an alkyl group, an alkenyl group, and an alkoxy group. These may be used alone or in combination of two or more. When the functional group is an OH (hydroxyl) group, if isocyanate is contained in the composition for an adhesion layer described later, the isocyanate forms a urethane bond with the OH (hydroxyl) group derived from the silicone-based foam stabilizer of the elastic layer, which can further improve the adhesiveness between the elastic layer and the adhesion layer. Therefore, among these, an OH (hydroxyl) group is preferable. When a moisture-curable adhesive agent described later contains MDI having two or more isocyanate groups, the reaction efficiency is high and the adhesiveness can be further improved because MDI is highly electron-withdrawing and easily reacts with the OH of the foam stabilizer.

The base layer composition may contain a conductive agent such as an ionic conductive agent or an electronic conductive agent to obtain conductivity. The ionic conductive agent is not limited, and examples thereof include ammonium salts of tetraethylammonium, tetrabutylammonium, dodecyltrimethylammonium (e.g. lauryltrimethylammonium), hexadecyltrimethylammonium, octadecyltrimethylammonium (e.g. stearyltrimethylammonium), benzyltrimethylammonium, modified fatty acid dimethylethylammonium or the like and perchloric acid, chloric acid, hydrochloric acid, bromic acid, iodic acid, hydroborofluoric acid, sulfuric acid, ethylsulfuric acid, carboxylic acid, sulfonic acid or the like; and alkali metal salts or alkaline earth metal salts of alkali metals and alkaline earth metals such as lithium, sodium, potassium, calcium, magnesium and perchloric acid, chloric acid, hydrochloric acid, bromic acid, iodic acid, hydroborofluoric acid, trifluoromethyl sulfuric acid, sulfonic acid or the like. In addition, the electronic conductive agent is not limited, and examples thereof include furnace black such as SAF, ISAF, HAF, FEF, GPF, SRF, FT, and MT, and conductive carbon black such as acetylene black and Ketjenblack; oxidized carbon for ink, pyrolytic carbon, natural graphite, and artificial graphite; conductive metal oxides such as tin oxide, titanium oxide, and zinc oxide; and metals such as nickel, copper, silver and germanium. These conductive agents may be used alone or in combination of two or more.

(Surface Layer)

The charging roller 1 of the present disclosure includes a surface layer 4 formed on the outer peripheral portion of the base layer 3 in the radial direction, either directly or with an optional intermediate layer therebetween, as illustrated as one embodiment in FIG. 1. The surface layer is a layer constituting a surface that is formed on the outermost side of the charging roller.

Figure 2:
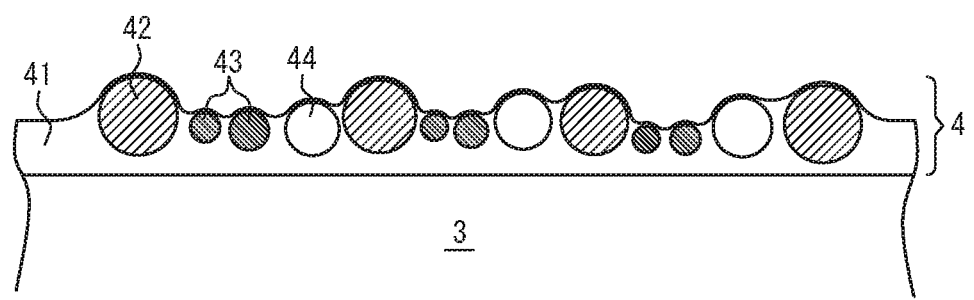
FIG. 2 is a cross-sectional view schematically illustrating a part of a surface layer in an embodiment of the charging roller of the present disclosure.

The surface layer 4 contains large-particle size particles 42 and small-particle size particles 43 having different average particle sizes, as illustrated as one embodiment in FIG. 2.

As used herein, the particle is a unit of substance having a certain shape and having a size within a certain range.

In addition, as used herein, the "particle size" of the "average particle size", and the "average particle size" are not particularly limited and may be, for example, defined as follows and measured and calculated respectively:

1) when the length of a particle measured according to a determined rule is taken as the particle size as it is (named the major axis diameter, minor axis diameter, unidirectional diameter, etc. according to the rule name), the arithmetic mean value of the particle sizes is taken as the average particle size;

2) when two or more lengths are measured in one particle according to a rule and their average value is taken as the particle size, the arithmetic mean value of the particle sizes is taken as the average particle size;

3) when the amount directly measured as the size of a particle (projected area or volume) is converted into a value of a particle having a regular shape (e.g. circle, sphere, or cube) using a geometrical formula and the value is taken as the particle size of the particle (measured with the image analysis method, shading method, coulter method, or the like, and the converted value is called equivalent diameter), the arithmetic mean value of the equivalent diameters is taken as the average particle size; and 4) when a value calculated from a measured amount is taken as the particle size of a particle using a physical law (e.g. Mie theory) derived under the assumption of a specific particle shape (e.g. sphere) and specific physical conditions (measured with the sedimentation method, or laser diffraction/scattering method, the calculated value is called effective diameter), the arithmetic mean value of the effective diameters is taken as the average particle size.

Note that, when the particle is spherical, the particle size corresponds to the diameter of the particle.

In the present disclosure, the average particle size refers to a size measured with the laser diffraction/scattering method unless otherwise specified.

The shape of the particle is not particularly limited, yet it is preferably spherical.

Further, the words "having different average particle sizes" mean that the ratio of average particle size calculated by the following formula (1) is 0.5 or less.

Ratio of average particle size=average particle size of small-particle size particle/average particle size of large-particle size particle   (1)

In the present disclosure, the ratio of average particle size is preferably 0.1 or more and more preferably 0.3 or more.

The large-particle size particles and the small-particle size particles contained in the surface layer of the charging roller of the present disclosure are defined as follows. When there are at least two types of particle size distributions with different average particle sizes (distribution where the horizontal axis is particle size of particles and the vertical axis is number of particles), in a combination of any two types of particle size distributions, particles having a particle size distribution with a larger average particle size are called large-particle size particles and particles having a particle size distribution with a smaller average particle size are called small-particle size particles.

It is considered that the large-particle size particles mainly contribute to the charging property and the charge imparting property. In addition, it is considered that the small-particle size particles, by filling the space between the large-particle size particles, prevent the large-particle size particles from aggregating in the surface layer and contribute to uniform dispersion of the large-particle size particles in the surface layer. Therefore, it is considered that, when the surface layer contains the large-particle size particles and the small-particle size particles having different average particle sizes, high charging property/charge imparting property can be uniformly distributed over the surface layer.

The large-particle size particles and the small-particle size particles may each be large-particle size particles and small-particle size particles formed of any material as long as they have different average particle sizes. The large-particle size particles and the small-particle size particles may not be hydrophilic. The large-particle size particles are preferably large-particle size acrylic resin particles and/or large-particle size urethane resin particles, and more preferably large-particle size acrylic resin particles. The small-particle size particles are preferably small-particle size acrylic resin particles and/or small-particle size urethane resin particles, and more preferably small-particle size acrylic resin particles.

The large-particle size particles may be a mixture of a plurality of types of large-particle size particles formed of different materials. The same applies to the small-particle size particles, where the small-particle size particles may be a mixture of a plurality of types of small-particle size particles formed of different materials. Large-particle size particles and small-particle size particles formed of different materials may also be combined.

When acrylic resin particles and/or urethane resin particles are used as the large-particle size particles and the small-particle size particles, the charging property/charge imparting property of the charging roller can be further improved, and the rigidity of the large-particle size particles and the small-particle size particles themselves can be further enhanced. As a result, it is possible to further improve the quality of image forming and printing and to further suppress deterioration due to the particles being scraped or dropping from the surface layer of the charging roller. In addition, by using commercially available acrylic resin particles and/or urethane resin particles, it is possible to manufacture a charging roller having superior charging characteristics (charging property/charge imparting property) and durability at lower costs and more easily.

The acrylic resin of the acrylic resin particles may be a known acrylic resin. Examples of the acrylic resin include acrylic resin and methacrylic resin.

Young's modulus relating to the rigidity of the large-particle size particles is preferably 5 mN/μm or more, more preferably 9 mN/μm or more, and particularly preferably 15 mN/μm or more. This is because, when the Young's modulus is in the above ranges, it is possible to more effectively prevent the large-particle size particles from being scraped or dropping from the surface layer.

The average particle size of each of the large-particle size particles and the small-particle size particles are not particularly limited as long as they have different average particle sizes. However, the large-particle size particles are preferably large-particle size particles having an average particle size of 10 μm or more and 20 μm or less, and the small-particle size particles are preferably small-particle size particles having an average particle size of 2 μm or more and less than 10 μm. This is because, when the average particle size of the large-particle size particles is 10 μm or more, it is possible to obtain more sufficient charging property/charge imparting property; when the average particle size of the large-particle size particles is 20 μm or less, the large-particle size particles are dispersed in the surface layer more uniformly (the charging property/charge imparting property of the surface layer of the charging roller is more uniform). In addition, this is because, when the average particle size of the small-particle size particles is 2 μm or more, the small-particle size particles appropriately fill the space between the large-particle size particles, and the aggregation of large-particle size particles in the surface layer can be further suppressed; when the average particle size of the small-particle size particles is less than 10 μm, the small-particle size particles enter the space between the large-particle size particles more easily.

In addition, the surface layer 4 further contains hydrophilic particles 44, as illustrated as one embodiment in FIG. 2.

When the charging roller of the present disclosure contains hydrophilic particles in the surface layer, the filming resistance is improved.

As used herein, the "hydrophilic" of the hydrophilic particles means that the water contact angle of the particles is more than 0 degree and less than 100 degrees. As used herein, the water contact angle means an angle formed, when the surface of the particle is in contact with water and air, by the surface of the water and the surface of the particle at a boundary line where the three phases contact each other. The water contact angle of a particle can be generally measured with a sessile drop technique, the pendant drop method, the Wilhelmy method, the Washburn's equation capillary rise method, or the like, and the water contact angle of the hydrophilic particles of the charging roller of the present disclosure is measured with a sessile drop technique. The water contact angle of the hydrophilic particles contained in the surface layer of the charging roller of the present disclosure is not particularly limited as long as it is greater than 0 degree and less than 100 degrees. However, the lower limit is more preferably 50 degrees or more, and the upper limit is preferably 90 degrees or less and more preferably 65 degrees or less. It is preferably, for example, more than 0 degree and 90 degrees or less, and more preferably, for example, 50 degrees or more and 90 degrees or less. This is because, when the water contact angle of the hydrophilic particles decreases (that is, the hydrophilicity increases), the filming resistance of the charging roller further improves.

Although the hydrophilic particles contained in the surface layer may be hydrophilic particles formed of any hydrophilic material, they are preferably hydrophilic silica particles and/or hydrophilic urethane resin particles and more preferably hydrophilic silica particles. In the present disclosure, the silica particles also include fumed silica particles.

The hydrophilic particles may be a mixture of a plurality of types of hydrophilic particles formed of different materials.

The reasons are as follows. By using hydrophilic silica particles and/or hydrophilic urethane resin particles, the filming resistance of the charging roller can be further improved. In addition, by using commercially available hydrophilic silica particles and/or hydrophilic urethane resin particles, the charging roller can be manufactured at lower costs and more easily. Further, hydrophilic silica particles and/or hydrophilic urethane resin particles are less likely to impair the charging property/charge imparting property, elasticity/flexibility, or other properties of the charging roller.

The average particle size of the hydrophilic particles is not particularly limited. However, the lower limit is preferably 2 nm or more and more preferably 3 μm or more. In addition, the upper limit is preferably 10 μm or less and more preferably 7 μm or less. This is because, when the average particle size of the hydrophilic particles is 2 nm or more, the hydrophilic particles are likely to be exposed to the outside of the surface layer of the charging roller, which further improves the filming resistance; when it is 10 μm or less, the hydrophilic particles are dispersed in the surface layer more uniformly (the filming resistance of the surface layer of the charging roller is more uniform).

The surface layer 4 is formed of a surface layer-forming resin 41, as illustrated as one embodiment in FIG. 2.

The surface layer-forming resin of the surface layer of the charging roller of the present disclosure may be a resin conventionally known as a surface layer-forming resin that forms a surface layer of a charging roller, yet it is preferably a urethane resin. This is because, when a urethane resin is used as the surface layer-forming resin, the flexibility of the charging roller can be enhanced, and toner damage can be suppressed.

As used herein, the urethane resin contained in the surface layer can be obtained by subjecting polyol and isocyanate to a polyaddition reaction with a known reaction method, and may be a conventionally known urethane resin that may be used as the urethane resin forming the base layer. When the surface layer contains a urethane resin, the flexibility of the charging roller can be enhanced, and the nip width can be increased.

The amount of the large-particle size particles contained in the surface layer is not particularly limited, yet it is preferably 5 parts by mass or more and 30 parts by mass or less with respect to 100 parts by mass of the urethane resin. This is because, when the surface layer contains 5 parts by mass or more of the large-particle size particles with respect to 100 parts by mass of the urethane resin, it is possible to obtain better charging property/charge imparting property; when the surface layer contains 30 parts by mass or less of the large-particle size particles with respect to 100 parts by mass of the urethane resin, the uneven space between the large-particle size particles in the surface layer will not be too narrow (the small-particle size particles enter the recess), and the large-particle size particles are dispersed in the urethane resin more uniformly (the charging property/charge imparting property of the surface layer of the charging roller is more uniform).

The amount of the small-particle size particles contained in the surface layer is not particularly limited, yet it is preferably 15 parts by mass or more and 75 parts by mass or less with respect to 100 parts by mass of the urethane resin. This is because, when the surface layer contains 15 parts by mass or more of the small-particle size particles with respect to 100 parts by mass of the urethane resin, the small-particle size particles fill the space between the large-particle size particles more sufficiently, and the large-particle size particles are dispersed in the urethane resin more uniformly (the charging property/charge imparting property of the surface layer of the charging roller is more uniform); when the surface layer contains 75 parts by mass or less of the small-particle size particles with respect to 100 parts by mass of the surface layer-forming resin, the viscosity of the surface layer composition described later will not be too high, and the handling will be easier.

The amount of the hydrophilic particles contained in the surface layer is not particularly limited. However, the lower limit is preferably 2 parts by mass or more and more preferably 5 parts by mass or more with respect to 100 parts by mass of the urethane resin. In addition, the upper limit is preferably 15 parts by mass or less. This is because, when the surface layer contains 2 parts by mass or more of the hydrophilic particles with respect to 100 parts by mass of the urethane resin, it is possible to obtain better filming resistance; when the surface layer contains 15 parts by mass or less of the hydrophilic particles with respect to 100 parts by mass of the urethane resin, the viscosity of the surface layer composition described later will not be too high, and the handling will be easier.

The elastic modulus of the surface layer is preferably 30 MPa or less and more preferably 25 MPa or less. This is because, when the elastic modulus is in the above ranges, the elasticity of the surface layer can be enhanced and the nip width can be increased, which further improves the quality of image forming and printing. Although the lower limit of the elastic modulus of the surface layer is not particularly limited, it is preferably 1 MPa or more from the viewpoint of, for example, roller durability.

The thickness of the surface layer is not particularly limited, yet it is preferably 1 μm or more and 40 μm or less and more preferably 5 μm or more and 35 μm or less. This is because, when the thickness is in the above ranges, it is possible to more reliably prevent the large-particle size particles, small-particle size particles and hydrophilic particles from falling off while ensuring the elasticity of the base layer.

The surface layer can be formed of a surface layer composition. The surface layer composition may, if necessary, contain an appropriate amount of a conductive agent and an additive, where examples of the additive include an antioxidant such as phenol and phenylamine, an agent that reduces friction, an agent that adjusts electric charges, a foam stabilizer, a surfactant, a filler, a crosslinking agent, a dispersant, a thickener, a thixotropic agent, a structural viscosity agent and the like, in addition to the aforementioned surface layer-forming resin, large-particle size particles and small-particle size particles having different average particle sizes, and hydrophilic particles further contained. In this case, the additive may be either inorganic or organic.

Although the conductive agent in the surface layer composition is not particularly limited, it is preferably a metal powder, an ionic conductive agent, an ionic liquid, a blend of conductive polymers, and carbon black, among which carbon black is more preferable. This is because, by using carbon black, it is possible to effectively suppress the occurrence of image defects while ensuring a higher discharge amount. In addition, carbon black is advantageous in that it is inexpensive and has little environmental change.

<Image Forming Apparatus>

The charging roller of the present disclosure can be used in an image forming apparatus such as a copying machine or a laser beam printer. Because the charging roller of the present disclosure has excellent charging characteristics (charging property/charge imparting property), elasticity/flexibility, and durability, as well as excellent filming resistance, an image forming apparatus using the charging roller of the present disclosure can keep excellent image forming and printing quality for a longer period of time.

Figure 3:
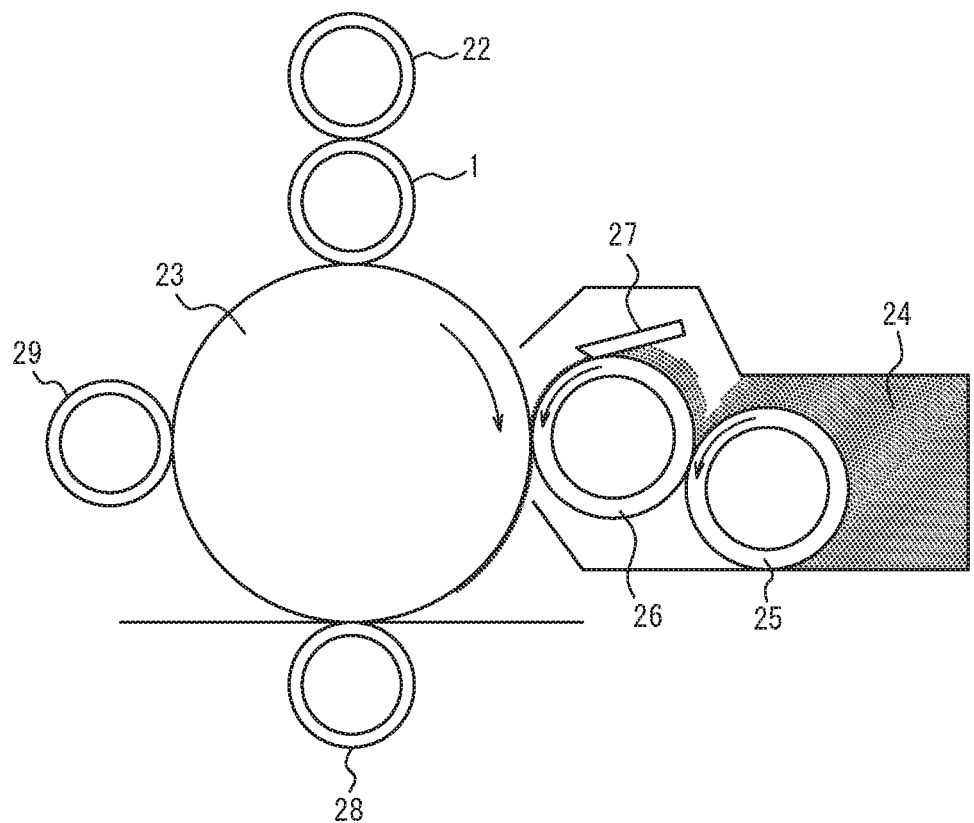
FIG. 3 is a partial cross-sectional view schematically illustrating an example of an image forming apparatus using the charging roller of the present disclosure.

FIG. 3 schematically illustrates an embodiment of an image forming apparatus using the charging roller of the present disclosure. The image forming apparatus of the present embodiment includes a photoconductor 23 on which an electrostatic latent image is formed, a charging roller 1 positioned near the photoconductor 23 (upper side in the figure) for charging the photoconductor 23, a toner supply roller 25 for supplying toner 24, a developing roller 26 arranged between the toner supply roller 25 and the photoconductor 23, a layer-forming blade 27 provided near the developing roller 26 (upper side in the figure), a transcribing roller 28 positioned near the photoconductor 23 (lower side in the figure), a photoconductor cleaning roller 29 arranged adjacent to the photoconductor 23, and a charging roller cleaning roller 22 arranged adjacent to the charging roller 1. The image forming apparatus of the present embodiment may further include known members commonly used in an image forming apparatus (not illustrated in the figure).

In the image forming apparatus illustrated in FIG. 3, first, the charging roller 1 is brought into contact with the photoconductor 23, a voltage is applied between the photoconductor 23 and the charging roller 1 to charge the photoconductor 23 to a constant potential, and then an electrostatic latent image is formed on the photoconductor 23 by an exposure device (not illustrated in the figure). Next, the photoconductor 23, the toner supply roller 25, and the developing roller 26 rotate in the direction of the arrow in the figure, so that the toner 24 on the toner supply roller 25 is supplied to the photoconductor 23 via the developing roller 26. The toner 24 on the developing roller 26 is arranged into a uniform thin layer by the layer-forming blade 27. As the developing roller 26 and the photoconductor 23 rotate while being in contact with each other, the toner 24 adheres to the electrostatic latent image on the photoconductor 23 from the developing roller 26, and the latent image is visualized. The toner 24 adhered to the latent image is transcribed to a recording medium such as paper by the transcribing roller 28, and the toner 24 remaining on the photoconductor 23 after the transcription is removed by the photoconductor cleaning roller 29. On the other hand, the toner 24 adhered to the charging roller 1 is removed by the charging roller cleaning roller 22.

EXAMPLES

The following describes the present disclosure in more detail with reference to Examples, where the following Examples are not to be construed to limit the scope of the present disclosure.

<Method of Preparing Charging Roller>

Charging rollers as comparative examples or examples were prepared with the following method.

A base layer made of foamed polyurethane prepared as described below was formed on an outer peripheral portion in the radial direction of a shaft made of sulfur free-cutting steel having an outer diameter of 6.0 mm, adjusted to have an outer diameter of 8.5 mm.

With respect to the foamed polyurethane, 100 parts by mass of a urethane prepolymer synthesized from tolylene diisocyanate (TDI) and polyether polyol (Daicel Corporation) and 2 parts by mass of acetylene black (Mikuni-Color Ltd.) were mixed to prepare a urethane prepolymer in which acetylene black was dispersed, and it was Component A. On the other hand, 30 parts by mass of polyol that had four hydroxyl groups in one molecule (EXCENOL 385SO, AGC Inc.) and 0.1 parts by mass of sodium perchlorate ($NaClO_4$) were mixed while being heated to 70° C., and then 4.5 parts by mass of polyether-modified silicone oil (foam stabilizer) and 0.2 parts by mass of dibutyltin dilaurate (catalyst) were mixed to prepare a mixture, and it was Component B. Then, the Components A and B were foamed with the mechanical floss method so that the density was 0.75 $g/cm^3$, to form a base layer.

Next, a water-dispersed polyurethane emulsion (SUPERFLEX 300, DKS Co. Ltd.) and water-dispersed carbon were used as conductive agents to prepare a coating material, which was applied to the outer peripheral portion in the radial direction of the base layer and adjusted to a thickness of 100 μm to form an intermediate layer.

Next, a surface layer composition prepared as described below was applied to the outer peripheral portion of the intermediate layer in the radial direction, heated at 120° C. for one hour for curing, and adjusted to a thickness of 10 μm to form a surface layer.

With respect to the charging rollers of Examples and Comparative Examples, the surface layer composition was prepared by compounding 30 parts by mass of a polyisocyanate component (EXCELHARDENER HX, ASIA INDUSTRY CO., LTD.), and further, in order to obtain certain surface properties, 13.65 parts by mass of large-particle size acrylic resin (SSX-115, average particle size 15 μm (value published by manufacturer), Sekisui Plastics Co., Ltd.) (equivalent to 10.5 parts by mass with respect to 100 parts by mass of urethane resin), 27.3 parts by mass of small-particle size acrylic resin (MBX-5, average particle size 5 μm (value published by manufacturer), Sekisui Plastics Co., Ltd.) (equivalent to 21 parts by mass with respect to 100 parts by mass of urethane resin), and a certain amount of substance that had been studied and added to prevent filming, with respect to 100 parts by mass of polycaprolactone diol (PLACCEL 220AL, Daicel Corporation) having a polystyrene-equivalent number-average molecular weight (Mn) of 2000 as a polyol component.

<Method of Measuring Water Contact Angle>

The water contact angle of each substance that had been studied and added to prevent filming was measured with the method described below. The water contact angle of the surface of the roller containing each substance was measured with a sessile drop technique and taken as the water contact angle of each substance.

<Method of Evaluating Filming Resistance of Charging Roller>

The charging roller to be evaluated was mounted on an image forming apparatus where the cleaning mechanism of a charging roller had been removed. After printing 3000 sheets, the Si spectrum area of 900-1300/cm of the surface of the charging roller was measured by IR measurement (FT-IR spectrophotometer NICOLET iS5 manufactured by Thermo fisher scientific). The following scores corresponding to the measured area values were used to indicate the evaluation result of the filming resistance of the charging roller.

Less than 0.5: extremely good
0.5 or more and less than 1: very good
1 or more and less than 1.5: good
1.5 or more and less than 2.5: poor
2.5 or more: very poor <Evaluation Result>

Table 1 lists the evaluation results of the filming resistance of the charging rollers, which were prepared as Comparative Examples or Examples.

Hydrophilic urethane resin particle (JB800): Negami chemical industrial co., ltd According to the results listed in Table 1, all the charging rollers of Comparative Example 1, in which no anti-filming substance was added, Comparative Examples 2 to 4, in which the added anti-filming substance was neither hydrophilic substance nor particles, Comparative Example 5, in which the added anti-filming substance was particles yet not hydrophilic substance, and Comparative Example 6, in which the added anti-filming substance was hydrophilic substance yet not particles, had a filming resistance evaluation result of "very poor" to "poor".

On the other hand, all the charging rollers of Examples 1 to 6, in which hydrophilic particles were added as an anti-filming substance, had a filming resistance evaluation result of "good" to "extremely good", which were better than the charging rollers of Comparative Examples.

In addition, it was found that, when the particles added as an anti-filming substance were hydrophilic particles, the filming resistance of the charging roller could be improved, even using hydrophilic silica particles (Examples 1 to 5) or hydrophilic urethane resin particles (Example 6)

TABLE 1

| | Anti-filming substance that had been studied and added | | Water contact angle of anti-filming substance (degree) | Average particle size $^{A)}$ | Part by mass $^{B)}$ | Evaluation result of filming resistance |
|---|---|---|---|---|---|---|
| | Anti-filming substance | Product name | | | | |
| Comparative Example 1 | No addition of anti-filming substance | — | — | — | — | Poor |
| Comparative Example 2 | Fluorine-based polymer | SK-03 | 118 | — | 3.5 | Very poor |
| Comparative Example 3 | Fluorine copolymer | MODIPER F206 | 111 | — | 3.5 | Very poor |
| Comparative Example 4 | Fluorine group-containing oligomer | MEGAFACE F555 | 110 | — | 3.5 | Poor |
| Comparative Example 5 | Hydrophobic fumed silica particle | AEROSIL RX200 | 100 | 12 nm | 3.5 | Poor |
| Comparative Example 6 | Urea urethane solution | BYK-420 | 91 | — | 3.5 | Poor |
| Example 1 | Hydrophilic fumed silica particle | AEROSIL 200 | 95 | 12 nm | 3.5 | Good |
| Example 2 | Hydrophilic silica particle | SYLYSIA 730 | 70 | 4.0 μm | 7 | Very good |
| Example 3 | Hydrophilic silica particle | SYLYSIA 430 | 58 | 4.1 μm | 3.5 | Extremely good |
| Example 4 | Hydrophilic silica particle | SYLYSIA 430 | 58 | 4.1 μm | 7 | Extremely good |
| Example 5 | Hydrophilic silica particle | SYLYSIA 430 | 58 | 4.1 μm | 14 | Very good |
| Example 6 | Hydrophilic urethane particle | JB800 | 60 | 6 μm | 7 | Extremely good |

A) With respect to the average particle size in the table, "-" means that there is no average particle size value because no anti-filming substance is added or the anti-filming substance is not a particle. The average particle size value in the table is based on the value published by the manufacturer of each particle product.

B) It is the numerical value of the part by mass of the anti-filming substances that had been studied and added with respect to 100 parts by mass of the urethane resin in the composition of the surface layer.

(Source of Each Particle Product)

Fluorine-based polymer (SK-03): DAIKIN INDUSTRIES, LTD

Fluorine copolymer (MODIPER F206): NOF CORPORATION

Fluorine group-containing oligomer (MEGAFACE F555): DIC Corporation

Hydrophobic fumed silica particle (AEROSIL RX200): NIPPON AEROSIL Co., Ltd.

Urea urethane solution (BYK-420): BYK-Chemie

Hydrophilic fumed silica particle (AEROSIL 200): NIPPON AEROSIL Co., Ltd.

Hydrophilic silica particle (SYLYSIA 730): FUJI SILYSIA CHEMICAL LTD.

Hydrophilic silica particle (SYLYSIA 430): FUJI SILYSIA CHEMICAL LTD.

Further, it was found there was a correlation between the low water contact angle of particles added as an anti-filming substance (that is, particles having high hydrophilicity) and the excellent filming resistance of the charging roller (Comparative Example 5, and Examples 1 to 6).

INDUSTRIAL APPLICABILITY

The present disclosure provides a charging roller that has excellent charging characteristics (charging property/charge imparting property), elasticity/flexibility, and durability, as well as excellent filming resistance. The charging roller provided by the present disclosure can be used in an image forming apparatus such as a copying machine or a laser beam printer where the image forming and printing quality is good and the good state continues for a longer period of time.

The invention claimed is:

1. A charging roller comprising a shaft, and at least a base layer and a surface layer on an outer peripheral portion of the shaft in a radial direction, wherein
   the surface layer contains large-particle size particles and small-particle size particles having different average particle sizes and further contains hydrophilic particles.

2. The charging roller according to claim 1, wherein a water contact angle of the hydrophilic particles measured with a sessile drop technique is more than 0 degree and 90 degrees or less.

3. The charging roller according to claim 2, wherein the large-particle size particles are large-particle size acrylic resin particles.

4. The charging roller according to claim 2, wherein the small-particle size particles are small-particle size acrylic resin particles.

5. The charging roller according to claim 2, wherein the hydrophilic particles are hydrophilic silica particles.

6. The charging roller according to claim 2, wherein the large-particle size particles are large-particle size particles having an average particle size of 10 µm or more and 20 µm or less, and the small-particle size particles are small-particle size particles having an average particle size of 2 µm or more and less than 10 µm.

7. The charging roller according to claim 2, wherein the hydrophilic particles are hydrophilic particles having an average particle size of 2 nm or more and 10 µm or less.

8. The charging roller according to claim 2, wherein the surface layer contains a urethane resin, and the surface layer contains 5 parts by mass or more and 30 parts by mass or less of the large-particle size particles with respect to 100 parts by mass of the urethane resin.

9. The charging roller according to claim 2, wherein the surface layer contains a urethane resin, and the surface layer contains 15 parts by mass or more and 75 parts by mass or less of the small-particle size particles with respect to 100 parts by mass of the urethane resin.

10. The charging roller according to claim 2, wherein the surface layer contains a urethane resin, and the surface layer contains 2 parts by mass or more and 15 parts by mass or less of the hydrophilic particles with respect to 100 parts by mass of the urethane resin.

11. The charging roller according to claim 1, wherein a water contact angle of the hydrophilic particles measured with a sessile drop technique is 50 degrees or more and 90 degrees or less.

12. The charging roller according to claim 1, wherein the large-particle size particles are large-particle size acrylic resin particles.

13. The charging roller according to claim 1, wherein the small-particle size particles are small-particle size acrylic resin particles.

14. The charging roller according to claim 1, wherein the hydrophilic particles are hydrophilic silica particles.

15. The charging roller according to claim 1, wherein the large-particle size particles are large-particle size particles having an average particle size of 10 µm or more and 20 µm or less, and the small-particle size particles are small-particle size particles having an average particle size of 2 µm or more and less than 10 µm.

16. The charging roller according to claim 1, wherein the hydrophilic particles are hydrophilic particles having an average particle size of 2 nm or more and 10 µm or less.

17. The charging roller according to claim 1, wherein the surface layer contains a urethane resin, and the surface layer contains 5 parts by mass or more and 30 parts by mass or less of the large-particle size particles with respect to 100 parts by mass of the urethane resin.

18. The charging roller according to claim 1, wherein the surface layer contains a urethane resin, and the surface layer contains 15 parts by mass or more and 75 parts by mass or less of the small-particle size particles with respect to 100 parts by mass of the urethane resin.

19. The charging roller according to claim 1, wherein the surface layer contains a urethane resin, and the surface layer contains 2 parts by mass or more and 15 parts by mass or less of the hydrophilic particles with respect to 100 parts by mass of the urethane resin.

20. An image forming apparatus using the charging roller according to claim 1.

\* \* \* \* \*